J. NEGRESCOU.
CLOTHES WASHING MACHINE.
APPLICATION FILED OCT. 4, 1918.

1,356,996.

Patented Oct. 26, 1920.
6 SHEETS—SHEET 1.

Fig.1

Inventor
John Negrescou
By James R. Offield
Atty

J. NEGRESCOU.
CLOTHES WASHING MACHINE.
APPLICATION FILED OCT. 4, 1918.

1,356,996.

Patented Oct. 26, 1920.
6 SHEETS—SHEET 2.

Inventor
John Negrescou
By James R. Offield
atty

J. NEGRESCOU.
CLOTHES WASHING MACHINE.
APPLICATION FILED OCT. 4, 1918.

1,356,996.

Patented Oct. 26, 1920.
6 SHEETS—SHEET 6.

Inventor
John Negrescou
By James R. Offield
Atty

UNITED STATES PATENT OFFICE.

JOHN NEGRESCOU, OF CHICAGO, ILLINOIS.

CLOTHES-WASHING MACHINE.

1,356,996.   Specification of Letters Patent.   Patented Oct. 26, 1920.

Application filed October 4, 1918. Serial No. 256,784.

*To all whom it may concern:*

Be it known that I, JOHN NEGRESCOU, a citizen of the United States, and a resident of Chicago, in the county of Cook and State of Illinois, have invented certain new and useful Improvements in Clothes-Washing Machines, of which the following is a specification.

My invention relates to clothes washing machines particularly to that class in which the clothes are washed by means of vacuum cups and rinsed and dried by centrifugal force, and the invention covers various improvements in construction and arrangement which make the machine more reliable, safe and efficient in its operation.

On the accompanying drawings a machine is shown which embodies all the features of my invention, and on which—

The cylindrical tub 1 is supported on legs 2, 2 and the cylindrical side of the tub is double-walled for the interposition of heat insulating material 3 such as asbestos. The top 4 covers a little more than the rear half of the tub and a removable cover 5 is provided for the front part. The cover part 4 supports upper and lower bearing boxes 6 and 7 which are axially located with reference to the tub and through which extends the tubular shaft 8 which has secured to its lower end the inverted U shaped frame 9. A key 10 locks the frame to the shaft against rotation thereon and a nut 11 threading on the lower end of the shaft locks the frame against the shoulder 12. Ball bearings 13 and 14 supported in the bearing boxes 6 and 7 hold the shaft 8 in axial alinement, and at the upper end of the shaft is secured the bevel gear 15 by means of which the shaft is rotated. To the arms of the frame 9 is secured the clothes basket 16 which at its lower end has the thrust bearing section 17 which engages in the companion thrust bearing section 18 secured to the base of the tub, the bearing balls 19 taking up the side thrust and the ball 20 taking up the vertical thrust, the basket structure being thus easily rotated and held axially within the tub. The bottom of the basket is slightly concave and has the water passageways 21. The cylindrical side wall of the basket has the peripheral beads or ridges 22 deflected outwardly therefrom and in which are the perforations 23 for the flow of water. These ridges leave annular grooves on the inside of the basket so that the inner side of the basket will act like a wash-board during the washing operation.

Extending through the tubular shaft 8 is the solid shaft 24 which at its lower end is journaled in the shaft 8, the shaft 24 being vertically reciprocable. Secured to the lower end of the shaft is the hub 25 having the long arms 26 and 27 extending therefrom in opposite directions and having the short arm 28 at right angles with the long arms. To the end of each arm is secured a vacuum cup 29.

Figures 4, 5:
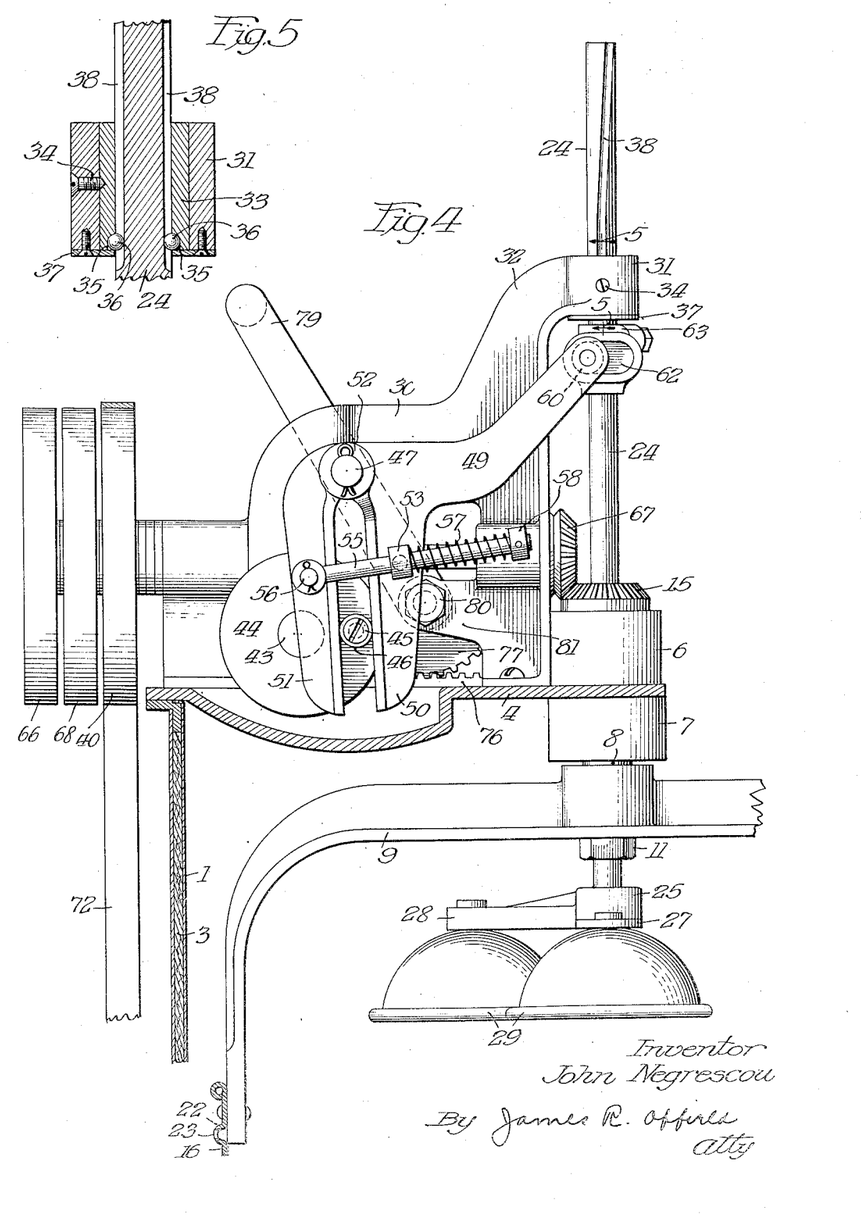
Fig. 4 is an enlarged elevational view of the other side of the machine showing particularly the suction cup controlling mechanism.
Fig. 5 is an enlarged sectional view on plane 5—5, Fig. 4.

On the top 4 of the tub is secured the bearing frame 30 which provides bearings and bearing supports for the various driving and controlling mechanisms for the machine. The vacuum cup supporting shaft 24 extends through the sleeve 31 at the end of the bracket 32 of the frame 30. As best shown in Fig. 5, the bushing 33 is secured in the sleeve as by means of the set screw 34, the lower end of the bushing having the pockets 35 in which the balls 36 are retained by the plate 37 secured against the lower end of the sleeve. Besides reducing the friction during vertical reciprocation of the shaft 24 these balls 36 act as keys for engaging in the ways 38 cut in the shaft. The upper ends of these ways are inclined so that during the lower part of the downward movement of the shaft 24 the shaft will be rotated through a small angle, the suction cups being first pressed against the clothes in the clothes basket and then the shaft is rotated to shift the clothes along a distance so that the cups will at their next downward movement engage some other part of the clothes.

The frame 30 journals the horizontal tubular shaft 39 which at its outer end has secured thereto the driving pulley 40. At its inner end the shaft carries the worm 41 which meshes with the worm wheel 42 at one end of the shaft 43 journaled in the frame 30 and extending below the shaft 39 at right angles therewith. The other end of the shaft has secured thereto the disk 44 on which the crank pin 45 pivots the cam roller 46. Journaled in the upper part of the frame 30 and extending parallel with the shaft 43 is the shaft 47 to whose ends are secured the arms 48 and 49. Extending downwardly from the arm 49 and secured thereto is the cam jaw 50, and opposite this jaw is the jaw 51, the inner faces of the jaws being parallel and receiving between them the cam roller 46. The jaw 51 extends from the hub 52 pivoted on the shaft 47 just outside the arm 49. A guide block 53 is secured to the arm 49 by the pin 54 so that it may oscillate axially, and through this guide block extends the rod 55 which at its rear end receives the pin 56 extending from the jaw 51, a compression spring 57 encircling the rod between the block 53 and the collar 58. The cam jaws are thus yieldably held together against the cam roller for a purpose which will be referred to later. At their front ends the arms 48 and 49 carry rollers 59 and 60 respectively which engage in the horizontal grooves 61 and 62 in the sides of the frame 63 which is clamped to the shaft 24 below the bearing sleeve 31 and secured by the screw 64. As the shaft 41 is rotated the disk 45 rotates and its cam roller plays against the jaws 50 and 51 to rock the shaft 47 and swing the arms 48 and 49 up and down so that the shaft 24 is vertically reciprocated. This reciprocation causes the vacuum cups to be repeatedly forced against the clothes in the basket 16, and during the latter part of the downward movement of the shaft and the beginning of its upward movement it is rocked axially by virtue of the balls 36 and key ways 38.

Figure 3:
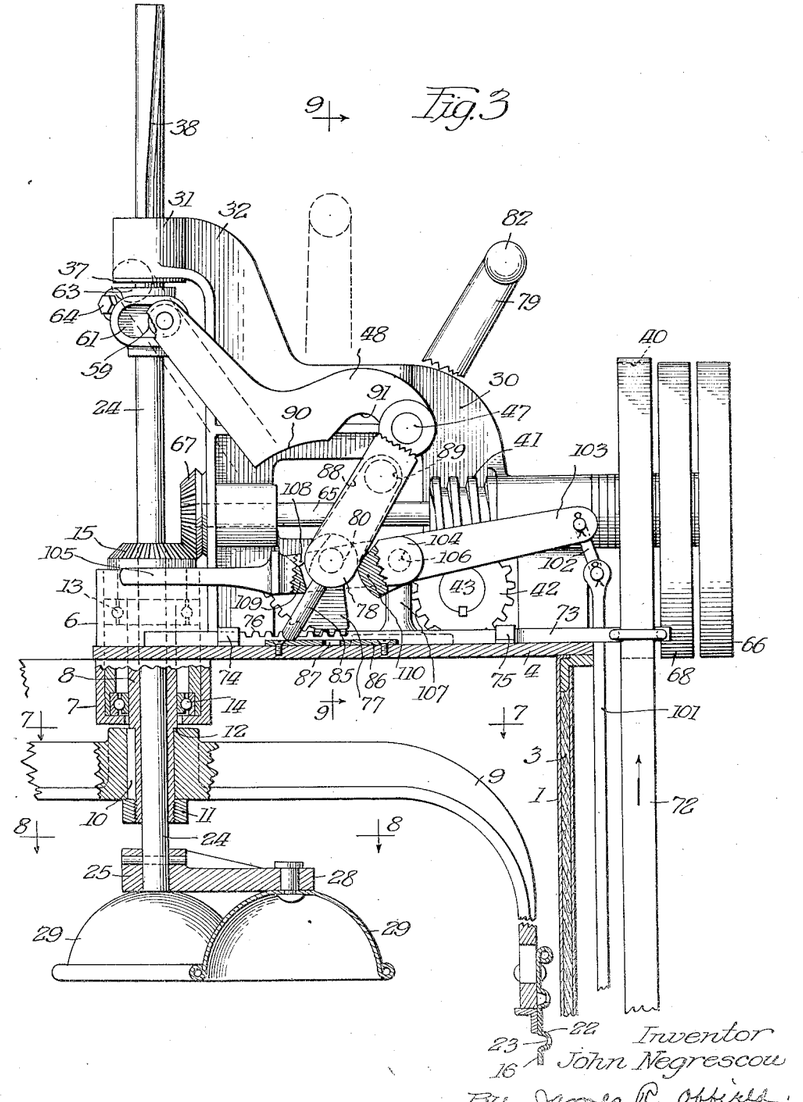
Fig. 3 is an enlarged side elevational view of the upper part of the machine with parts in section and broken away to more clearly reveal the construction and operation.
Figure 9:
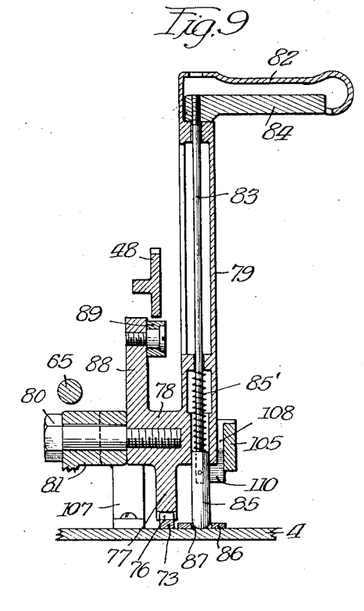
Fig. 9 is a sectional view on plane 9—9, Fig. 3.

Journaled in the tubular shaft 39 and in the front end of the bearing frame 30 is the shaft 65 which at its rear end carries the driving pulley 66 and at its front end supports the bevel pinion 67 which meshes with the pinion 15 at the upper end of the shaft 8 which supports the clothes basket. Loosely journaled on the shaft 65 between the pulleys 40 and 66 is the idler pulley 68. On the platform 69 supported by the legs 2 of the machine is seated an electric motor 79 whose driving pulley 71 is engaged by the belt 72 which is adapted to be shifted into engagement with either of the pulleys 40, 66 and 68. The belt shifting mechanism 70 comprises a bar 73 reciprocable on the top 4 of the machine through the guide straps 74 and 75. The top of the bar has teeth 76 which are engaged by the gear segment 77 which extends from the hub 78 of the lever 79. As the lever is swung the belt may be shifted into engagement with either the driving pulleys or the idler pulley. The lever 79 is pivoted by means of a stub shaft 80 extending therefrom and journaled in the bearing extension 81 on the frame 30. The lever 79 has the handle 82, the lever and handle being hollow. Through the lever extends the rod 83 which at its upper end has the arm 84 extending therefrom in the hollow handle and at its lower end has the pin 85, the spring 85' within the handle tending to urge the pin outwardly. Secured on the machine top 4 is the plate 86 having the hole 87 in which the pin 85 engages when the lever is in vertical or neutral position, that is, when the lever has been swung to cause the belt to be shifted into engagement with the idler pulley 68. The lower end of the pin 85 is rounded so that it may leave the hole 87 and permit forward or rearward swing of the lever to shift the belt to the respective drive pulleys, and when the lever is in its forward or rearward position the pin is still urged outwardly against the plate 86 to yieldingly lock the lever in its extreme positions. As shown in Figs. 3 and 9, the hub 78 of the belt shifting lever has the vertical arm 88 which pivots the roller 89 at its end in position below the arm 48. The arm 48 at its under side has the arcuate surface 90 which is engaged by the roller 89 when the lever 79 is in neutral position or swung to its forward position to connect the driving belt with the pulley 66 which drives the rotating mechanism for the clothes basket 16. Between this surface 90 and the hub of arm 48 is the notch 91 which permits vertical swing of the arms to vertically reciprocate the shaft 24 when the lever 79 is swung rearwardly to connect the driving belt with the pulley 40. With this arrangement, when the lever 79 is in neutral position and the driving belt shifted to the idler pulley, the shaft 24 will be held up and the suction cups elevated so as to permit the clothes to be charged into or removed from the basket 16. Also when the lever is shifted forwardly to shift the belt to cause rotation of the basket for drying the clothes the shaft 24 will be held up to elevate the vacuum cups so that they will not interfere with the clothes during the rapid rotation of the basket. When the lever is swung to its rear position the notch 91 permits the arm 48 to clear the roller 89 and the shaft 24 can be reciprocated to operate the vacuum cups. The spring actuated pin 85 will yieldingly lock the lever 79 in its adjusted positions but by pressure against the under side of the arm 84 in the handle 82 the pin can be positively raised.

Figure 1:
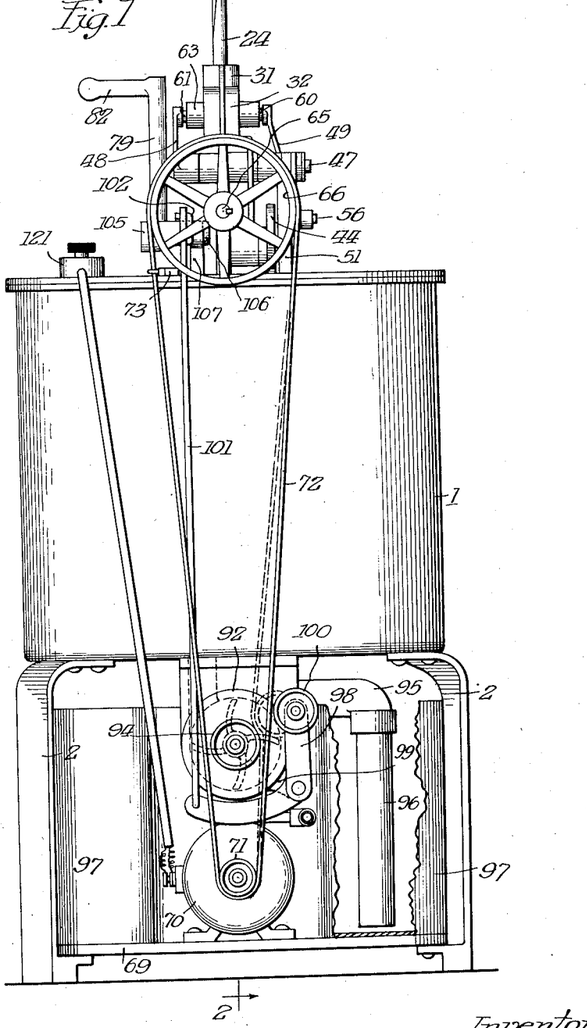
Figure 1 is a rear elevational view.
Figure 2:
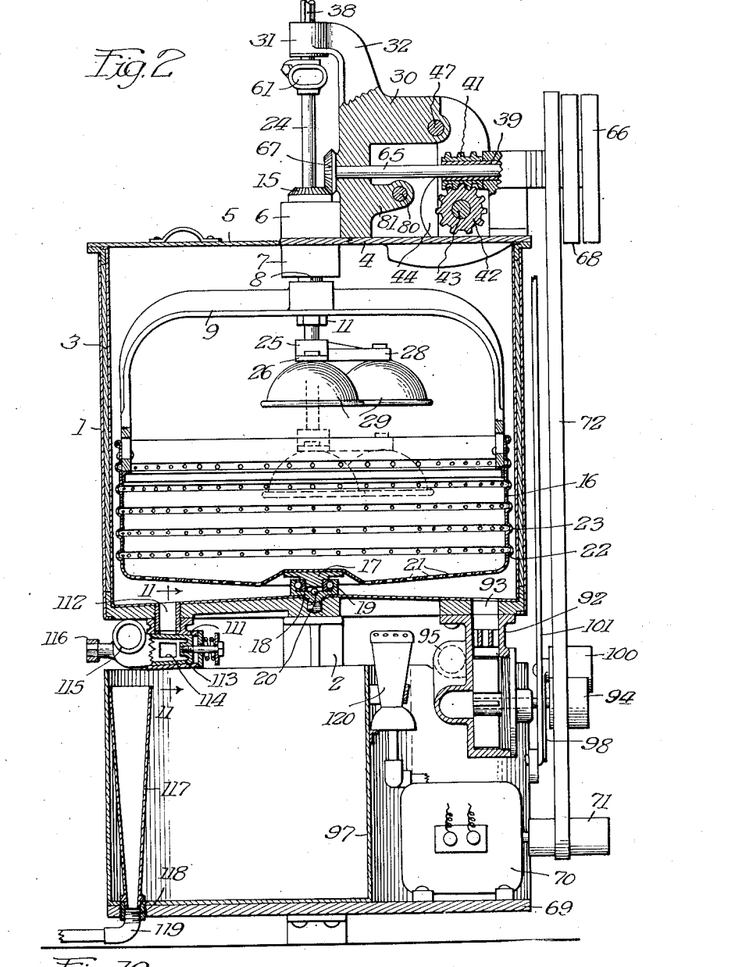
Fig. 2 is a sectional view on plane 2—2, Fig. 1.

Suspended from the bottom of the tub 1 is a pump 92 which communicates with the tub interior through the passageway 93, the pump shaft having the belt pulley 94 located between the legs of the drive belt 72. The inlet 95 of the pump is connected by a pipe 96 with the bottom of the water tank 97 supported on the platform 69 (Fig. 1). When the pump is operated the tank contents are pumped into the tub.

A bell crank lever 98 is pivoted on a bracket 99 extending from the pump frame, the vertical arm of this lever having journaled thereon an idler pulley 100, one leg of the drive belt 72 passing between this idler pulley and the pump pulley. Extending from the end of the horizontal limb of the bell crank lever is the rod 101 which is connected by the link 102 with the arm 103 extending rearwardly from the hub 104 of the lever 105. The lever hub is fulcrumed by means of the bearing pin 106 extending from the bracket 107 mounted on the machine top 4. With this arrangement when the lever 105 is swung upwardly the rod 101 will be shifted downwardly and the bell crank lever 98 swung to cause the pulley 100 to engage with the drive belt 72 and press it against the pump pulley 94 so that the pump is operated. When the lever is released the tension of the driving belt will throw back the lever 98 and restore the lever 105 to normal position.

Figure 6:
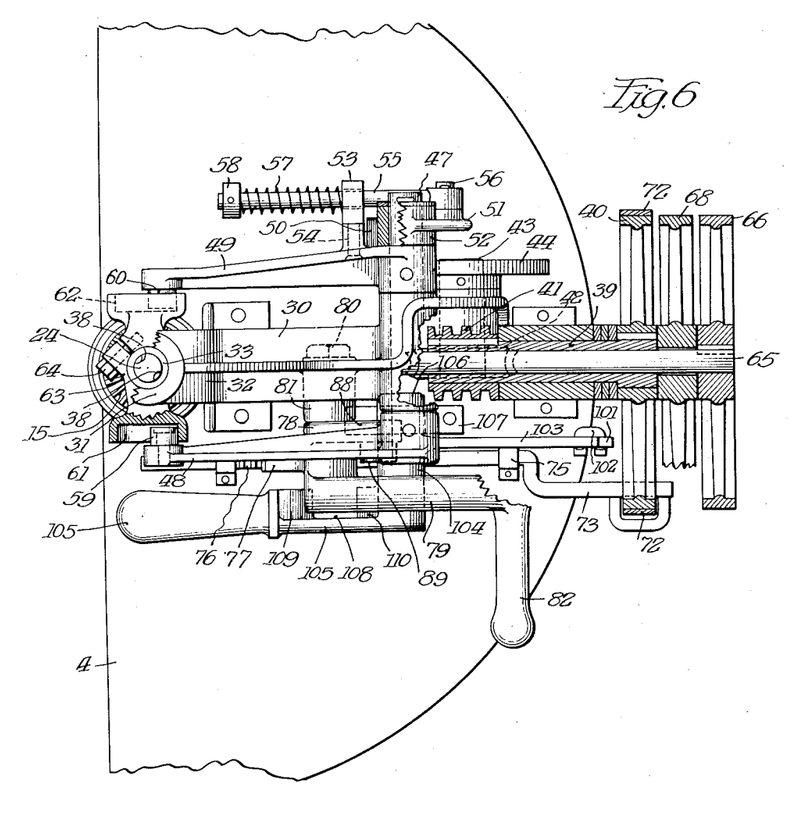
Fig. 6 is a plan view of the parts shown in Fig. 4 partly in section.
Figure 7:
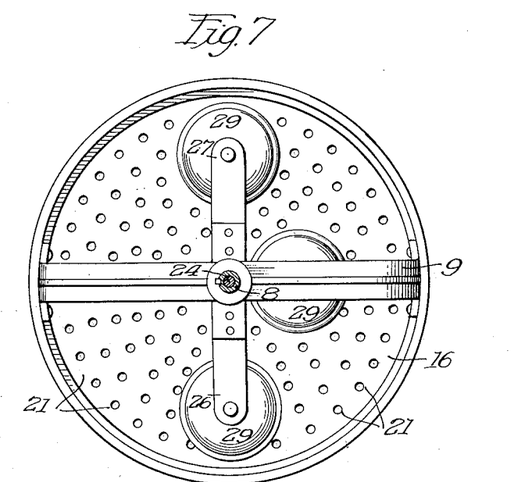
Fig. 7 is a view from plane 7—7, Fig. 3.
Figure 8:
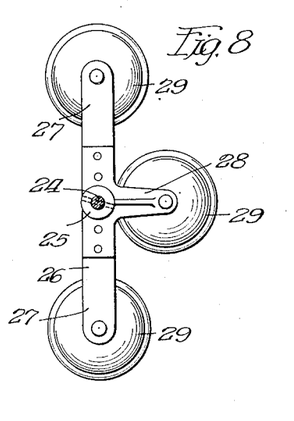
Fig. 8 is a plan view of the suction cup structure.

I preferably provide means for preventing adjustment of the lever 105 for operation of the pump while the vacuum cups are in operation or the basket is being positively rotated. As best shown in Figs. 3 and 6, the lever 105 has the vertical notch 108 into which the hub 78 of the belt shifting lever 79 extends. On the front wall of this notch is the abutment lug 109 and on the rear wall of the notch is the abutment lug 110. These lugs are so arranged that when the lever 79 is in neutral position the lever 105 can be adjusted to cause operation of the pump. However, when it is attempted to swing the lever 105 upwardly to start the pump when the belt shifting lever 79 is in its rear position (Fig. 3) and the vacuum cups are in operation, the abutment 110 will engage with the lever 79 and prevent adjustment of the lever 105. Likewise, when the lever 79 is in its forward position and the basket is being rotated the abutment 109 will engage with the lever and prevent pump starting adjustment of the lever 105. It is only when the lever 79 is in neutral position that the pump starting lever can be operated. At other times its operation is blocked by the lever 79 and the pulley 100 held away from the drive shaft 72. Interference between the washing, drying and pumping operations is therefore prevented.

Figures 10, 11:
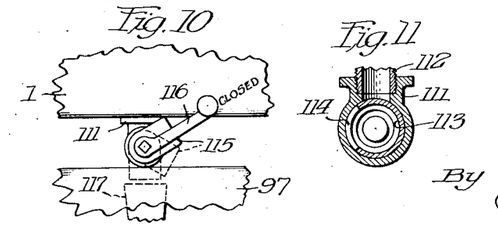
Fig. 10 is a front elevational view of the water flow controlling valve.
Fig. 11 is a sectional view on plane 11—11, Fig. 2.

Above the tank 97 the valve housing 111 is secured to the tub bottom and communicates with the tub interior through the pipe 112, the tub bottom being preferably arched a trifle so that water will flow toward this pipe. Within the valve housing is the hollow valve plug 113 which has the inlet opening 114 and the outlet spout 115, a handle 116 being provided for rotating the plug. Extending through the tank in the path of the spout is the funnel 117 which at its lower end fits in the seat 118 connected with the drain outlet pipe 119. When the funnel is down it prevents communication of the tank with the drain pipe and when it is raised the tank may be drained. As shown in Fig. 10, the valve plug may be rotated to bring the spout outlet directly over the funnel 117 so that the tub contents can run directly to the drain pipe 119. When the spout is turned to an inclined position it will direct the water past the funnel inlet and into the tank 97, while further turning of the valve will shut off its inlet opening 114 from the pipe 112.

A burner 120 is shown by means of which water in the tub may be heated. The switch 121 for controlling the motor circuit may be mounted on the machine top to be readily accessible.

Briefly describing the operation of the machine, the lever 79 is placed in neutral position to connect the belt with the idler pulley and to lock the arm 48 in its up position in order that the vacuum cups are held well above the clothes basket so that clothes can be charged into the basket. Fresh water is charged into the tub or the lever 105 is raised to cause operation of the pump to charge water into the tub from the tank 97. The lever 79 is then swung rearwardly to shift the belt to the pulley 40, the arms 48 and 49 being then swung and the shaft 24 vertically reciprocated to alternately press the vacuum cups against the clothes and to draw them away therefrom, the shaft being rotated a distance at the end of its downward movement so that the cups advance the clothes a distance and so that when the cups are again lowered they will be in engagement with a different part of the clothes. Thorough and uniform cleaning of the clothes is thus assured. The basket rotates with the clothes and as the clothes are compressed and released by the cups the annular grooves in the basket will act like a wash-board to assist in thoroughly cleaning the clothes.

After the clothes have been sufficiently washed the machine is stopped and part or all of the washing water is discharged from the tub either into the tank 97 or directly to the drain pipe, and rinsing water is then charged into the tub and the cups again operated. After the rinsing operation the machine is stopped and the rinsing water drained from the tub. The lever 79 is then shifted to its forward position to connect the drive belt with the pulley 66 and to lock the shaft 24 and the vacuum cups in upper position. The basket is now rapidly rotated and the centrifugal force draws the water out of the clothes to any degree desired, depending upon the speed and length of rotation of the basket, the water flowing through the basket perforations and into the tub to be drained therefrom. If the pump is to be operated at any time to pump water from the tank into the tub the lever 79 must first be shifted to neutral position. When in such neutral position the cups will be held in raised position and the dry clothes can readily be withdrawn from the tub opening normally closed by the cover 5.

As before described, the jaw 51 is yieldable. When this jaw is engaged by the roller 46, the arms 48 and 49 are swung downwardly to shift down the vacuum cup supporting shaft 24. If for any reason there is excessive resistance to downward travel of the cups, as when there are too many clothes in the basket or the clothes pile up, the jaw 51 will yield and prevent breakage. Yielding pressure of the cups against the clothes will also give better washing results.

I do not of course desire to be limited to the exact construction, arrangement and operation shown and described as changes and modifications are no doubt possible which would still come within the scope of the invention. I claim as follows:

1. In a washing machine, the combination of a tub, a supporting frame, a shaft journaled in said frame and extending into said tub, and means for imparting a longitudinally reciprocatory movement to said shaft embracing a rocker arm mounted on said frame and operatively connected to said shaft, a drive shaft having a crank pin, said rocker arm being provided with separable jaw members embracing said crank pin, and tension means acting on said jaw members to maintain them in driving engagement with said crank pin.

2. In a washing machine, the combination of a tub, a rotative clothes receptacle mounted in said tub, a shaft extending into said receptacle, a rocker arm engaging said shaft and actuated to impart longitudinal reciprocatory movement to said shaft, drive shafts operatively connected with said rocker arm and said clothes receptacle, a prime mover, means for alternately connecting said prime mover with said drive shafts embracing a shifting lever, and means for locking said reciprocating shaft from movement during the rotation of said receptacle.

3. In a washing machine, the combination of a tub, a clothes receptacle mounted to rotate within said tub, driving mechanism connected with said receptacle, a shaft extending into said receptacle, a rocker arm engaging said shaft, driving mechanism for imparting longitudinal reciprocatory movement to said shaft, a prime mover adapted for driving connection with said receptacle, and said shaft driving mechanism embracing a shift lever operative in one position to connect said prime mover with said receptacle and to lock said shaft driving mechanism from movement.

4. In a washing machine, the combination of a tub, a rotative clothes receptacle mounted within said tub, a supporting frame mounted on said tub, a shaft journaled in said supporting frame and extending into said receptacle, clothes engaging members mounted at the end of said shaft, driving mechanism for said shaft and receptacle, a reservoir below said tub provided with inlet and return passages connecting said tub and reservoir, a pump in said return passage, a prime mover in operative connection with said shaft and receptacle driving mechanisms and with said pump, and shift mechanism operative to alternately connect and disconnect said shaft and receptacle driving mechanisms with said prime mover, and a lever operatively connected with said pump and co-acting with said shift lever to prevent the operation of said pump when said shaft or receptacle is in operation.

5. In a washing machine, the combination of a tub, a rotative clothes receptacle mounted in said tub, driving mechanism for said receptacle, a prime mover operatively connected with said receptacle driving mechanism, a lever operative to connect and disconnect said driving mechanism and prime mover, a liquid intake passage communicating with said tub, a pump in said passage and operative by said prime mover, an operating lever for connecting and disconnecting said pump and prime mover, said receptacle driving mechanism lever and pump operating lever being provided with co-acting members affecting the locking of said pump actuating lever from movement into operative position when said receptacle driving mechanism is in operative connection with said prime mover.

6. In a washing machine, the combination of a tub, a rotative clothes receptacle mounted in said tub, a liquid supply passage communicating with said tub and a pump in said passage, a clothes agitator in said tub, separate driving mechanism associated with said receptacle, agitator, and pump, a driving motor adapted to be successively connected with said receptacle, agitator, and pump driving mechanisms, and operating levers associated with the several driving mechanisms, and co-acting means associated with said levers for locking two of said driving mechanisms from movement when one of said driving mechanisms is in operation.

7. In a wash machine, the combination of a tub, a vertical shaft extending into said tub, a bearing frame on said tub for journaling said shaft, vacuum cups at the lower end of said shaft, an arm pivoted on said bearing frame at one end and connected with said shaft at its other end, said arm having a cam slot, a crank pin, a cam roller on said pin engaging in said slot, and means for revolving said crank pin to cause rocking of said arm and vertical reciprocation of said shaft, said shaft having a key-way, a key supported on said bearing frame and engaging in said key-way, the outer end of said key-way extending diagonally whereby when said key is in engagement therewith the shaft will be partially rotated.

8. In a wash machine, the combination of a tub, a bearing frame thereon, a vertical shaft journaled on said frame and extending into said tub, vacuum cups at the lower end of said shaft, an arm pivoted at one end on said bearing frame, abutments on said shaft, the outer end of said arm extending between said abutments, a jaw member secured to and extending from said arm, a companion jaw member pivoted at one end adjacent said arm and having a cam surface opposed to that of the arm jaw member, spring mechanism tending to hold said jaw members together, a cam member extending between said jaw members, and means for revolving said cam member whereby said arm is oscillated and said shaft reciprocated vertically.

9. In a wash machine, the combination of a tub, a bearing frame supported thereon, a vertical shaft journaled on said frame and extending into the tub, suction cups at the lower end of said shaft, a cross shaft journaled on said bearing frame, an arm receiving said shaft at one end, upper and lower abutments on said vacuum cup shaft, an extension on the outer end of said arm engaging between said abutments, a jaw member extending from said arm, a companion jaw member parallel with said arm jaw member and pivoted on said cross shaft, a cam member extending between said jaw members, yielding mechanism tending to hold said pivoted jaw member against said cam member, and means for revolving said cam member whereby said arm is rocked and said vacuum cup shaft reciprocated.

10. In a wash machine, the combination of a tub, a vertical tubular shaft arranged at the axis of said tub and having journal suspension at the top thereof, a clothes basket supported on the lower end of said shaft, a vertical shaft extending through said tubular shaft into the tub, vacuum cups at the lower end of said shaft, a bearing frame on said tub in which the shaft is journaled at its upper end, a drive shaft journaled on said frame and having driving connection with said tubular shaft, a driving connection between said driving shaft and said vacuum cup supporting shaft for vertically reciprocating said shaft, a driving motor, clutch mechanism for connecting said motor with said driving shaft to cause operation of either said tubular shaft or said cup supporting shaft, and means for automatically locking said cup supporting shaft in upper position when said clutch mechanism is operated to connect the motor for operation of said tubular shaft.

11. In a wash machine, the combination of a tub, a tubular shaft journaled and suspended from the top thereof and extending into the tub, a clothes basket supported at the lower end of said shaft, a second shaft extending through said tubular shaft, vacuum cups at the lower end of said second shaft, a driving shaft having driving connection at its inner end with said tubular shaft, a second driving shaft, a driving train extending between said second driving shaft and said cup supporting shaft for causing vertical reciprocation of said shaft, belt pulleys on said driving shafts, a driving motor, a belt driven thereby, clutch mechanism for shifting said belt to either of said driving pulleys, and means operated to lock said cup supporting shaft in its upper position when said clutch mechanism is actuated to connect said belt with the pulley of the driving shaft connected with the clothes basket supporting shaft.

12. In a wash machine, the combination of a tub, a vertical tubular shaft extending into said tub and journaled on the top thereof, a clothes basket connected with said shaft, a second shaft extending through said tubular shaft, vacuum cups supported at the lower end of said shaft, a bearing frame on said tub, in which the upper end of said second shaft is journaled, a driving shaft journaled on said frame and having driving connection at its inner end with said tubular shaft, a belt pulley on the outer end of said driving shaft, an arm pivoted at one end to said frame, upper and lower abutments on said cup supporting shaft between which the other end of said arm engages, jaw members extending from said arm to form a cam slot, a cam member projecting into said slot, a second driving shaft, a driving train between said second driving shaft and said cam member for revolving said cam member to cause rocking of said arm and vertical reciprocation of said cup supporting shaft, a belt pulley on said second driving shaft, a driving motor, a belt driven thereby, belt shifting mechanism for shifting said belt into engagement with either of said belt pulleys, and means for locking said arm to hold said cup supporting shaft in its upper position when said belt shifting mechanism is shifted to connect said belt with the pulley on the driving shaft connected with the clothes basket supporting shaft.

13. In a wash machine, the combination of a tub, a vertical tubular shaft extending into said tub and journaled on the top thereof, a clothes basket connected with said shaft, a second shaft extending through said tubular shaft, vacuum cups supported at the lower end of said shaft, a bearing frame on said tub in which the upper end of said second shaft is journaled, a driving shaft journaled on said frame and having driving connection at its inner end with said tubular shaft, a belt pulley on the outer end of said driving shaft, an arm pivoted at one end to said frame, upper and lower abutments on said cup supporting shaft between which the other end of said arm engages, jaw members extending from said arm to form a cam slot, a cam member projecting into said slot, a second driving shaft, a driving train between said second driving shaft and said cam member for revolving said cam member to cause rocking of said arm and vertical reciprocation of said cup supporting shaft, a belt pulley on said second driving shaft, a driving motor, a belt driven thereby, belt shifting mechanism for shifting said belt into engagement with either of said belt pulleys, a lever for operating said belt shifting mechanism, and an abutment shifted with said lever to engage with said arm when said lever is actuated to set the belt shifting mechanism to connect the belt with the pulley on the driving shaft for the clothes basket supporting shaft, such engagement causing the arm to be held up and a cup supporting shaft locked in its upper position.

14. In a wash machine, the combination of a tub, an axially rotatable clothes basket therein, a shaft extending from said basket, a second shaft extending into said tub, vacuum cups at the lower end of said second shaft, a bearing framework on said tub for journaling said shafts, a driving shaft for said clothes basket shaft journaled on said framework, reciprocating mechanism mounted on said framework for vertically reciprocating said tub supporting shaft, a second driving shaft journaled on said framework and having driving connection with said reciprocating mechanism, belt pulleys for said driving shafts and an idler pulley between said belt pulleys, a driving motor, a belt driven thereby, belt shifting mechanism for selectively shifting said belt to said pulleys, a lever for controlling said shifting mechanism, and an abutment on said lever for engaging with said reciprocating mechanism to lock the cup supporting shaft in its upper position when said shifting mechanism is operated by said lever to shift the belt either to the idler pulley or to the pulley on the driving shaft for the clothes basket supporting shaft.

15. In a wash machine, the combination of a tub, clothes washing mechanism within the tub, driving mechanism for said washing mechanism, driving shafts for said driving mechanism, a driving motor, means for connecting said driving motor with said driving shafts, a pump for pumping water into said tub, means for connecting said pump in driving relation with said motor, and means for preventing such driving connection of the pump when said motor is connected with said driving shafts.

16. In a wash machine, the combination of a tub, clothes washing mechanism in said tub, actuating mechanism for such clothes washing mechanism, driving shafts connected with said actuating mechanism, belt pulleys on said driving shafts, a driving motor, a belt driven thereby, belt shifting mechanism, a lever for actuating said belt shifting mechanism to shift the belt to either of said pulleys, a pump, a driving pulley for the pump, means for shifting said pump pulley into engagement with said shaft, a lever for controlling said pulley shifting mechanism, and means controlled by said belt shifting mechanism lever for preventing operation of the pump controlling lever when said belt shifting controlling lever has been actuated to cause connection of said belt with either of said belt pulleys.

17. In a wash machine, the combination of a tub, clothes washing mechanism in said tub, actuating mechanism for said clothes washing mechanism, driving shafts connected with said actuating mechanism, belt pulleys on said driving shafts, a driving motor, a belt driven thereby, belt shifting mechanism, a lever for actuating said belt shifting mechanism to shift the belt to either of said pulleys, a pump, a driving pulley for the pump, means for shifting said pump pulley into engagement with said shaft, a lever for controlling said pulley shifting mechanism, and abutments on said pump controlling lever engaged by said belt shifting controlling lever when said lever is moved to positions to cause shifting of the belt to either of said driving shaft pulleys whereby said pump controlling lever will be prevented from being operated.

18. In a wash machine, the combination of a tub, clothes washing mechanism in the tub, driving shafts for said washing mechanism, belt pulleys on said driving shafts, an idler pulley associated with said driving shaft pulleys, belt shifting mechanism for shifting said belt to any one of said pulleys, a pump having a belt pulley, mechanism for shifting said belt against said pump pulley, and means for preventing shifting of said belt against the pump pulley when said belt is in engagement with either one of said driving shaft pulleys.

19. In a wash machine, the combination of a tub, clothes washing mechanism in the tub, driving shafts for said washing mechanism, belt pulleys on said driving shafts, an idler pulley associated with said driving shaft pulleys, belt shifting mechanism for shifting said belt to any one of said pulleys, an operating lever for said belt shifting mechanism, a pump having a belt pulley, means for deflecting said belt against said pump pulley to cause rotation thereof, an actuating lever for controlling said belt deflecting means, said belt deflecting controlling lever being free to be operated when said belt shifting mechanism controlling lever is in neutral position and the belt in engagement with the idler pulley, and abutments on said belt deflecting controlling lever engaged by said belt shifting mechanism controlling lever when said belt is shifted into engagement with either one of said driving shaft pulleys whereby at such times operation of the belt deflecting controlling lever is prevented.

In witness whereof I hereunto subscribe my name this 1st day of October, A. D. 1918.

JOHN NEGRESCOU.